United States Patent Office 3,006,236
Patented Oct. 31, 1961

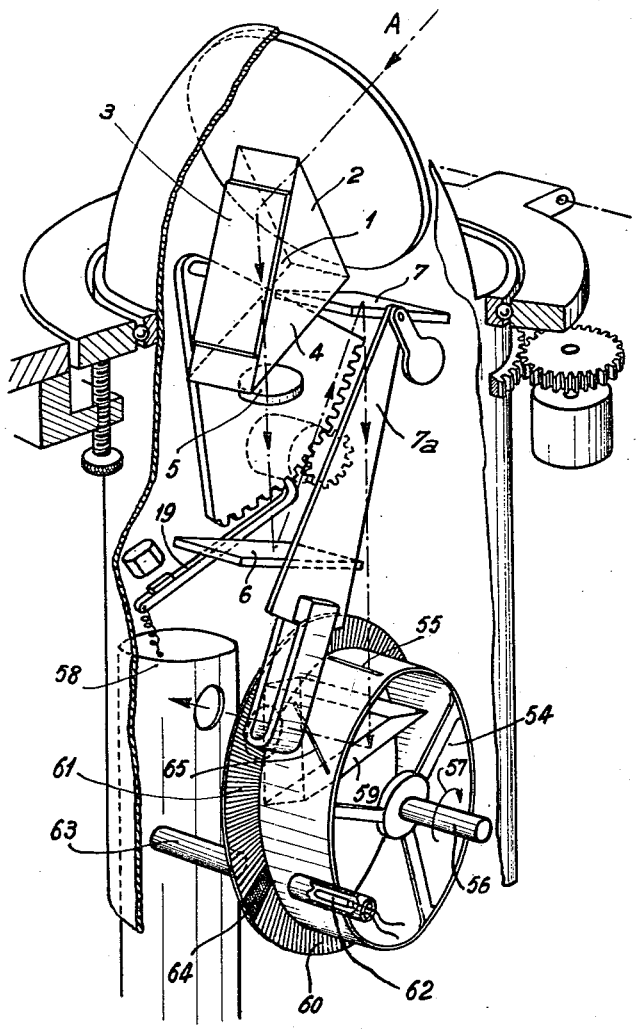

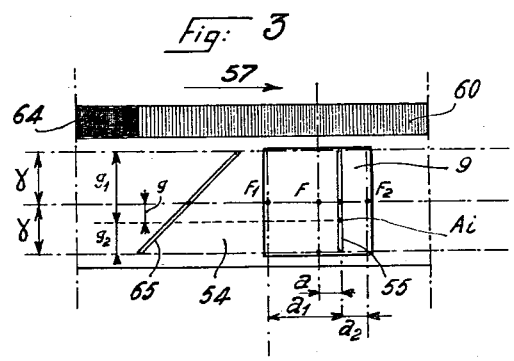

3,006,236
APPARATUS FOR ASTRONOMICAL NAVIGATION
Robert A. H. Michaud, Paris, France, assignor to Sud-Aviation, Societe Nationale de Constructions Aeronautiques, Paris, France, a company of France
Filed June 9, 1958, Ser. No. 740,613
Claims priority, application France June 17, 1957
13 Claims. (Cl. 88—2.4)

In my previous U.S. patent application, Serial No. 600,098 filed July 25, 1956, now abandoned, there has been described an apparatus for astronomical navigation, designed for mounting on a moving device, essentially based on the automatic repetition of a large number of rapid measurements of vertical angular distances (in the present case zenithal distances), the appropriate devices of which automatically determine the mean value during their measurement. The use of this instrument is also based on a previous knowledge of an approximate value, or at least of the order of magnitude of the angle to be measured, and on the effective measurement of the angular complement only, positive or negative, which is added to it automatically by the said instrument in order to obtain the precise value of that angle.

To this end, the instrument comprises, as essential devices or members: an orientable optical system of the sextant type, a highly-damped pendular device intended to supply the local apparent vertical, an image-analyser tube similar to the photography tubes used in television, the photo-cathode of which is arranged in the focal plane of the optical system, scanning devices of lines and images, analogous to those currently used in television, and finally electronic and electro-mechanical means for counting lines and images. In this apparatus, the optical system comprises a total-reflection prism which passes to its lens the image of an observed star; the optical axis of this system follows a line broken by reflection on two mirrors, of which one is rigidly fixed to the indicator device of the local apparent vertical; the analysis lines of the images (which should contain the image of the star formed on the focal-cathode of the analyser tube) are perpendicular to the local vertical plane passing through the observed star; finally, the line-counting means are provided to act, during each image, only between two predetermined instants: one by the passage of the scanning beam over the image of this star, and the other by the passage of this beam over an image which serves as a reference of the apparent vertical of the plane.

The present invention has for its object changes and improvements in the astronomical navigation apparatus described in said previous patent application; these changes and improvements have the result of simplifying this apparatus, while at the same time increasing its robustness and its facility of use, and to enable readings or measurements to be made of the angular complement of a horizontal angle, a bearing for example; they consist in eliminating the analyser tube together with the scanning devices necessitated by this tube and in substituting for them a mechanical device which is composed of a drum and a disc, rigidly fixe dtogether and rotating at a practically constant speed. On its lateral surface, the drum is provided with equi-distant slots which uncover at uniform intervals the photo-sensitive surface of an electron-multiplier photo-electric cell, so that the latter generates a current impulse each time it receives, through one of thse slots, a beam of light issuing from the image of the observed star; the axis of rotation of the drum is arranged roughly perpendicularly to the local vertical plane already referred to, passing through the star observed, and its lateral surface practically coincides in a certain angle, with the focal surface of the optical system; thus during the rotation of the drum, a well-defined portion of this latter is scanned at regular intervals successively by each of the slots of this drum. The disc which is rigidly fixed to it also carries on its peripheral portion one or more series of slots or of transparent lines which uncover at regular intervals, which are much shorter, a photo-electric cell, generating each time an impulse which serves as a unit of angular measurement in order to be able to dispense with a time base.

In the ultimate case, thes canning of the focal surface of the optical system by the slots of the drum corresponds to the scanning of images referred to in said previous patent application, and replaces it, whilst the passage in front of a photo-electric cell of a certain number of slots (variable according to the circumstances, as will be explained later in the present description), or of transparent lines of the disc, corresponds to the scanning of lines, also mentioned in said previous patent application and replaces it. In these scanning devices referred to in the said patent, the position of the image of the star, in the interior of each image formed on the focal surface of the optical system, is marked by the number of analysis lines comprised between one of the edges of the used portion of this surface and the image of the star, the distance between axes of two consecutive lines corresponding to a minute of angle.

In the present device, the distance between axes of two slots or two consecutive lines of the disc corresponds also to the minute of angle, and the position of the image of the star (parallel to the plane of the disc) is marked by the number of impulses generated by this disc and counted from one of the edges of the portion used of the said surface, up to this image. The photo-multiplier associated with the slots of the drum on the one hand and the photo-electric cell associated with the slots of the disc on the other, are thus connected to electronic means, similar to those referred to in said previous patent application in order to count respectively the number of image impulses and the number of line impulses; finally, one of the two rotary members carries means intended to generate marking impulses which, during each scanning, fix the beginning and the end of the count.

The rotating cylinder provided by the present invention comprises, in addition, means which enable measurements to be effected simultaneously of the angular complement of the approximate value of a horizontal angle, utilised as a local horizontal co-ordinate, such as for example a "bearing." These means consist on the one hand in the association of each of the slots already referred to, in the rotary drum, which are rectilinear and follow a generator line, with a further slot in the form of an arc of a helix strictly positioned with respect to that preceding; they consist on the other hand in means for counting the number of impulses generated by the rotation of the said drum and of the disc, between the passage of the rectilinear slot and that of the helicoidal slot on the image of the observed star formed on the focal surface of the optical system.

The description which follows below with reference to the accompanying drawings, which are given by way of example only and not in any sense by way of limitation, will make it quite clear how the invention will be carried into effect, the special features which are brought out either in the drawings or in the text being understood to form a part of the said invention.

FIG. 2 shows a general view, partly in cross-section, of the apparatus described in the patent application already mentioned, and to which the changes and improvements provided by the present invention have been made.

FIG. 3 is a basic diagram of the measuring device for the angular complement which must be added to the approximate value of a horizontal angle (bearing) in order to obtain an exact value of that angle.

Figure 1:
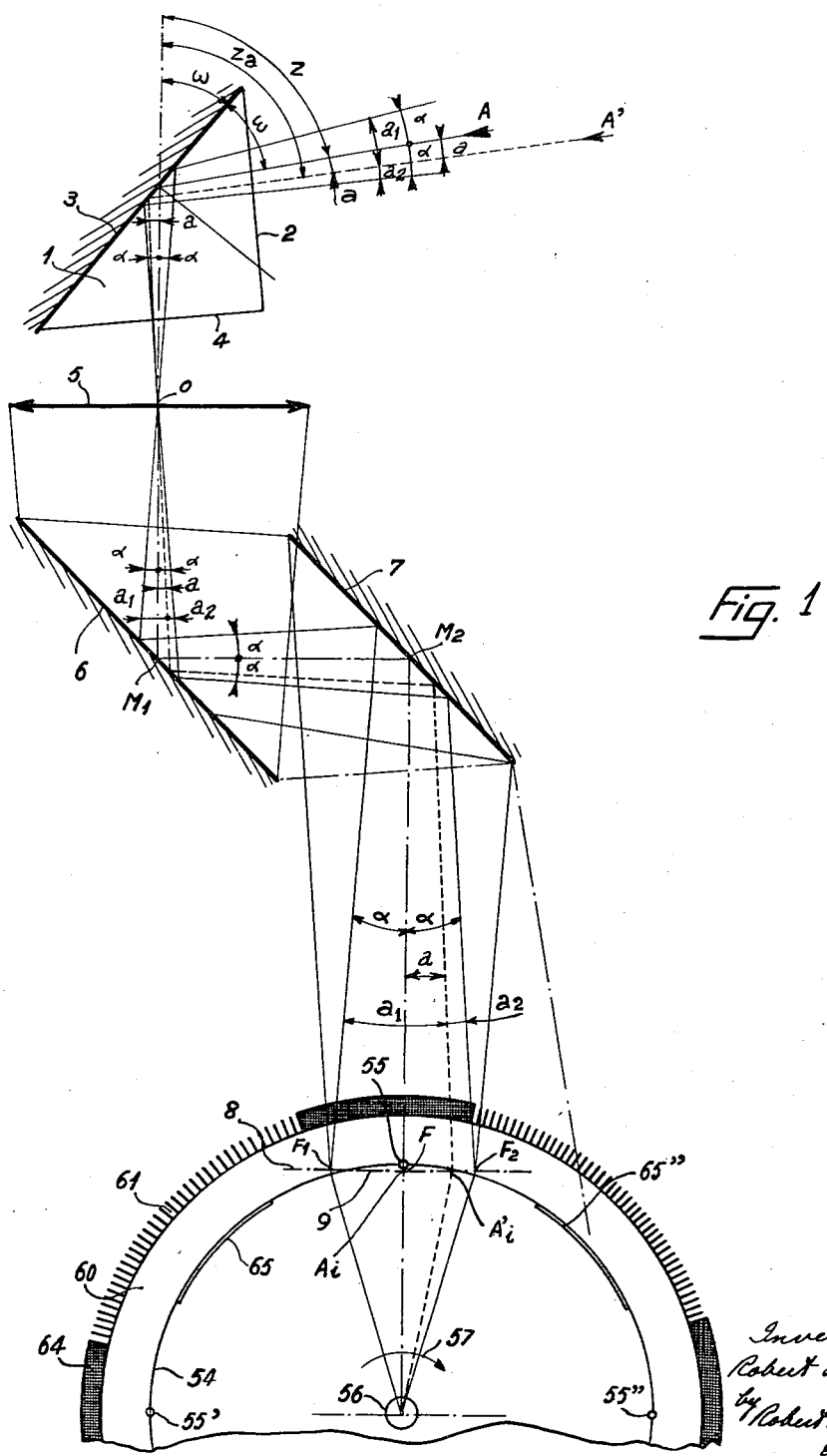
FIG. 1 is a diagram of principle of the optical system and of the measuring device for the angular complement which must be added to the approximate value of a vertical angle (zenithal distance) in order to obtain an exact value of that angle.

FIG. 4 is a synoptic diagram of the electronic and electro-mechanical devices for counting measuring impulses The incident ray coming from the observed star A, passes into the orientatable prism 1 with total reflection, by the face 2 of this latter, is reflected on the face 3, and emerges from the face 4. It then passes into the lens 5 with its centre at O, and having its optical axis substantially vertical, with a focal distance $f$. Between the lens 5 and its focal point F are arranged the two mirrors 6 and 7, which are substantially parallel, the first fixed and the second rigidly fixed to the pendular device $7a$ which serves as an indicator of the local apparent vertical. The optical axis of the lens 5 follows the broken line $OM_1M_2F$ and the relation:

$$OM_1 + M_1M_2 = f/2$$

referred to in the said previous patent application, is observed. The relation $OM_1 + M_1M_2 = f/2$ arises from the construction of the instrument and is true only when the mirrors $M_1$ and $M_2$ are parallel to each other and are each at an angle of 45° to the portion OM of the optical axis. However, said relation can always be considered as at least approximately true, because of the smallness of the angle $\alpha$, or of the length $F_1F_2$ as compared to the length of the optical axis $OM_1M_2F$.

In the particular case shown in chain-dotted lines in FIG. 1 in which the angle Z of the star with the direction $OM_1$ is equal to $2\omega$, Za is the apparent zenithal distance of this star with respect to the apparent vertical defined by the device $7a$; the two mirrors 6 and 7 are then parallel, and the image $A_1$ of this star is formed at the focal point F. This focus is placed at the centre of the portion 9 of the focal surface (focal plane) 8 of the lens 5; as already indicated in said previous patent application, in practice, Za differs from $2\omega$ by an angle $a$ (the complement to be measured) comprised between zero and plus or minus $\alpha$, the parallelism of the mirrors 6 and 7 is only approximate, and the image $A_1$ of the star A is then formed to the right hand or the left hand side of the focus F, for example at $A'_1$ when the star is in the direction A' and when its rays follow the optical path shown in broken lines in FIG. 1. In the limit, if $a$ equals minus $\alpha$, this image is formed at the point $F_1$ and if $a$ equals plus $\alpha$, it is formed at the point $F_2$.

A drum 54 rotating about a shaft 56 which is parallel, by construction, to the pivotal axis of the prism 1 and to that of the mirror 7, is tangential to a plane slightly above and parallel to focal plane 8, as viewed in FIG. 1, the drum cutting plane 8 along two generator lines at or closely adjacent to the points $F_1$ and $F_2$, i.e., the drum passes through or close to these points. It carries a rectilinear slot 55 formed along a generator line (perpendicular to the plane of the drawing and registering, radially of the drum, with the point F, in the position of the drum shown in FIG. 1). When the drum 54 rotates about its shaft 56 in the direction of the arrow 57, the slot 55 sweeps from left to right (and therefore from the point $F_1$ towards $F_2$) the portion used 9 of the focal plane 8. When this slot meets the image $A_1$ (or $A'_1$) of the star observed, the rays of light issuing from this image cease momentarily from being cut off by the opaque wall of the drum and act on the photo-cathode of a photo-multiplier of electrons 58 (see FIG. 2) on to which they are directed by a second fixed prism 59 with total reflection, arranged inside this drum. The photo-multiplier 58 then generates a current impulse; it is then only necessary to count the number of these impulses in order to know the number of the successive sweeps, that is to say the number of measurements effected in a given time or during the course of a single cycle of measurements. In practice, the drum 54 can carry a number of slots 55 which are identical and angularly equidistant; in FIG. 1, it is provided with four of which three 55, 55' and 55" are shown. The number M of measurements made in the unit of time is thus multiplied by the number $n$ of these slots. Instead of taking the focus F as the origin, it is simpler to take one of the points $F_1$ or $F_2$ (or more precisely one of the edges of the focal surface used), as already mentioned in said previous patent application. In fact, by taking for example the edge of this surface, passing through the point $F_1$ as the origin, and by making (see FIGS. 1 and 3):

$$Za = 2\omega - \alpha + a_1$$

the angular complement $a_1$ to be measured, expressed in minutes of angle is always positive and varies from zero to 2.

It is then only necessary to measure the arc $F_1A_1$ (or $F_1A'_1$) in order to have a measurement of the angular complement $a_1$. To this end, the present invention provides for the adjunction to the drum 54 of an opaque co-axial disc 60 which is rigidly fixed to it, and which carries a certain number of peripheral slots or transparent lines 61. These slots or lines, of which the distance between axes corresponds to one minute of the angle $2\alpha$ uncover successively a source of light 62 which acts on a photo-electric cell 63. This device is shown diagrammatically in FIG. 2, whilst FIG. 1 shows the distribution of the slots or the lines on the disc rigidly fixed to a drum having four rectilinear slots. In addition, the disc 60 is divided into four equal sectors, separated by opaque portions 64, all of the same angular width.

The slotted sectors of the disc 60 and the opaque portions which separate them are spaced apart and fixed, taking account of the relative positions of the edges (containing respectively the points $F_1$ and $F_2$) of the scanned surface 9 on the one hand, and of those of the source of light 62 and the cell 63 on the other. The number of impulses of the drum-disc rotary assembly, counted while it makes a rotation corresponding to the arc $F_1A_1$ (or $F_1A'_1$) supplies, during the course of each sweep, a value of the angular complement $a$, expressed in minutes. It is thus only necessary to count these impulses (which will be termed "angle impulses" hereinafter), the number of which corresponds, as already stated, exactly to the number of lines of the line-scanning system described in said previous patent application.

The total number of sweeps carried out by the rectilinear slots 55 of the drum 54, that is to say the total number of measurements effected during the course of each cycle of measurement, is preferably a whole number, for example 500; in this way, the number registered by the counting means, and which can be read directly at the end of the cycle, is equal to the mean value $a_m$, expressed in minutes, of the angular complements $a$ taken at each measurement.

In practice, the counting can be carried out in a number of equivalent ways: in accordance with a first form of embodiment of the invention, the impulses generated by the movement of the disc 60 can be counted during the whole duration of the sweeping of the arc $F_1A_1$ (or $F_1A'_1$) by the slot 55 of the drum, and this counting may cease when this slot, by uncovering the image of the observed star, generates a current impulse through the intermediary of the photo-multiplier 58; this impulse (which will hereinafter be termed the "star-impulse") can be used in particular to block the counting device of the angle impulses, for example by means of an electronic flip-flop device; this device then records not $a$ but $a_1$. The angle effectively measured is $a_1$ and not $a$ because the counting of the generated pulses is started just as a slot in the drum or the first division of a sector of the disc passes the first encountered edge of the area of the image and is stopped just as this slot or division passes the area of the image. This edge is located $\gamma$ degrees ($\gamma=4°$) before the optical axis, at point $F_1$, while said axis is at point $F$.

In accordance with a second form of embodiment of the invention, the counting device of the angle impulses remains blocked and these impulses are not counted as long as the slot 55 has not come opposite the image of the star observed. At the instant when the said slot comes into this position, the star impulse releases the said device which will again be blocked during the first consecutive passage of an opaque portion 64 of the disc in front of the source of light 62. If the fixed position of this opaque portion is suitable, there is then measured, not the angular complement $a$ but the angle $a_2$ equals $(2\alpha-a_1)$, and the zenithal distance desired then has the value:

$$Za = 2\omega + \alpha - a_2$$

but electronic counters, familiar to specialist technicians, permit of the automatic transition from this value to that preceding, if it is so desired. In this case $a_2$ is measured because the counting of the pulses is started just as a slot in the drum or the first division of a sector of the disc first enters registry with the area of the image and is stopped just as this slot or division passes the second encountered edge of the area of the image.

In accordance with a further form of embodiment of the invention, the slot 55 of the drum 54 uncovers an auxiliary beam of light and generates an "origin" impulse at the psecise instant when it passes through the point $F_1$. This impulse releases an electronic switch or "gate," which then transmits the angle impulses generated by the disc 60 to the counting chain, until the star impulse subsequently generated by this slot again blocks this switch.

The present invention further enables simultaneous measurements to be mae of the angular complement $g$ of a horizontal angle, a bearing for example. To this end, with each rectilinear slot 55 of the drum 54 there is associated an inclined slot 65, traced along a helical arc; this slot is arranged, depending upon the direction of rotation, behind the previous slot, and is strictly positioned with respect to this latter.

This arrangement is illustrated in FIG. 3, which enables the principle of measurement of the angle $g$ to be explained. In this figure, the surface 9, limited by the heavy lines, is the portion utilised of the focal plane of the lens 5 of the optical system. A portion of the drum 54 and of the disc 60 (the latter being turned back in the plane of the drawing) is shown as developed on the said focal plane. A slot 55 formed along a generator line of the drum 54, and a slot 65 formed along a straight line at 45° with the slot 55, are shown in this drawing. The drum 54 and the disc 60 rotate with a regular motion in the direction of the arrow 57. As already explained with reference to the measurement of the vertical angular complement $a$, the slot 55 sweeps or scans all the surface 9 between its passages from the point $F_1$ to the point $F_2$; during this scanning, it necessarily passes through the point $A_1$, the image of the observed star, and then produces the emission of the star impulse. This figure clearly shows the principle of measurement of the angle $a$. (either by that of the angle $a_1=a+\alpha$, or by that of the angle $a_2=|(2\alpha-a_1)|$, and makes it quite clear that this angle depends solely on the position of the image $A_1$ parallel to the direction of rotation of the drum, but is independent of the position of this image along the axis (or a generator line) of this drum.

The measurement of the agnular complement $g$ on the other hand, depends only on this last positon, which is determined with precision by the number of angle impulses generated by the disc 60, between the passages, first of the slot 55 and then of the slot 65, over the image $A_1$. Following the construction of the apparatus and the fixing of the various members, the angle $g$ is zero when the image $A_1$ is on the straight line $F_1$—$F_2$; it is positive when the image is located above the straight line, and negative when it is below, and $g$ thus varies between $-\gamma$ and $+\gamma$; in practice, and solely for reasons for simplicity, $\gamma$ is chosen to be equal to $\alpha$, the surface 9 is then limited by a square, and the measurement of the angle $g$ is deduced either from that of the angle $g_1=\gamma+g$, or from that of the angle $g_2=2\gamma-g_1$, as has already been explained in connection with the measurement of the angle $a$. The beginning of the opaque portion 64 of the disc 60 which terminates the sector used of the slots of this disc, preferably corresponds to the passage of the rear extremity of the slot 65 through the generator line which carries the point $F_1$.

In a preferred form of embodiment of the invention, the disc 60 is made from a transparent plastic material or from glass and on one of its faces it is provided with a sensitive emulsion, on which the slots 61 are made by photographic means, in the form of alternate transparent and opaque lines. By way of example, it may be mentioned that it is especially possible in this way to provide 1920 transparent lines distributed over four equal sectors each comprising 480 lines on a disc of only 13 cms. in diameter.

The counting, both of the star impulses and the angle impulses, the principle of which has been explained, is carried out by counting chains similar to those described in said previous patent application, but modified in order to satisfy the particular needs of the apparatus which has just been described, especially in respect of the origin and the end of each counting operaiton, and also the simultaneous counting of the impulses which fix: as regards some, the value of the angle $a$, and as regards the others the value of the angle $g$, since certain impulses may be concerned at the same time in both counts.

FIG. 4 shows a mono-filar synoptic diagram of these chains, of which all the elements are known and currently used, but the adaptation, the grouping and the connections of which with a view to the mode of operation which results, belong to the invention.

In the non-limitative example of construction shown in FIG. 4, the star impulses are generated by the drum 54, the angle impulses by the disc 60, and the point $F_1$ is taken as the origin for the counting of the latter, in each measurement of the angle $a_1$ (the angular complement $a$ of which is immediately deduced). In addition, it is assumed that each cycle of measurement comprises 500 consecutive scannings of the surface 9, explored by the slots of the said drum. It is thus necessary to use in one of these chains, at least four frequency dividers in cascade forming an integrating divider, the successive ratios of which are 1/4, 1/5, 1/5, 1/5 and the total ratio is 1/500.

The star impulses issuing from the photo-multiplier 58 and generated by the passage of each rectilinear slot (such as 55) of the drum 54 in front of the image $A_1$ (or $A'_1$, depending on its position) of the star formed on the surface 9 swept or scanned by this slot, are transmitted to an amplifier 66 with two stages, preferably of the low-frequency type with resistance-capacity coupling; the "amplitude-frequency" response curve of this amplifier permits of sufficient attenuation of the troublesome low-frequency components which are mainly due to the average level of the upper atmosphere, which is more or less bright. The amplifier 66 transmits these impulses to a threshold separator 67 which further amplifies and transmits them to another separator stage 68 (which may, when so desired, be incorporated in that preceding) intended to separate the said impulses from those (of different width) which will be generated during the passage of an oblique slot (such as 65) between the image of the star and the photo-multiplier. The first are transmitted, on the one hand, to an electro-mechanical totalling counter 69, which is automatically blocked as soon as it has recorded 500 impulses corresponding to 500 measurements, and on the other hand to an electronic switch which they block periodically.

At the same time, the angle impulses issuing from the photo-cell 63 and generated by the passage of each transparent line (such as 61) of the disc 60 in front of this cell, are transmitted to an amplifier 70, and then from this latter, on the one hand to the electronic switch 71 and on the other to a separator stage 72 which isolates that of these impulses, wider than the others, generated at the precise moment when the rectilinear slot considered on the drum 54 passes in front of the point $F_1$. This "origin" impulse then releases the switch 71 which is normally blocked, and the latter transmits the angle impulses to the counting chain 73, until it is again blocked by the first star impulse which it receives from the separator 68. Thus, during the course of each scanning of the surface 9 (see FIGS. 1 and 3) the electronic switch 71 transmits to the chain 73 all the angle impulses generated during, and only during the interval of time which separates the passage of the rectilinear slot of the drum 54, first in front of the point $F_1$, and then in front of the point $A_1$ of this surface. The number of these impulses fixes the value of the vertical angle $a_1$ measured by this scanning. The counting chain which comprises the integrating divider referred to, with a total ratio of 1/500, supplies the main value of this angle, resulting from the 500 measurements which form a measurement cycle.

In order to measure simultaneously the angle component $g$ of a horizontal angle (bearing) fixing the orientation of the moving body, in the manner indicated with reference to FIG. 3, the device shown diagrammatically in FIG. 4 comprises a second electronic switch 74, analogous to the switch 71 and receiving, like this latter, the angle impulses delivered from the amplifier 70. This switch is normally blocked, but is opened by the star impulse generated during the passage of each rectilinear slot 55 in front of the image $A_1$ (or $A'_1$) of the star observed (see FIGS. 1 and 3), and is re-blocked by the star impulse generated during the consecutive passage, in front of this same image, of the oblique slot 65 which is associated with that preceding. During, and only during, the time which elapses between these two passages, the switch 74 transmits the angle impulses to the circuits which follow it. In order that the second of these impulses, which is first transmitted to the members 66 and 67 already referred to, may not act either on the switch 71 and the chain 73, or on the totalling device 69, its duration is chosen to be different from that generated by the first slot 55, which enables the separator stage 68 to isolate it so as to apply it to the switch 74 alone. If the value of $g$ does not necessitate any great precision, it may be sufficient to apply the impulses transmitted by this switch to an electronic tube (for example a pentode) mounted in a standard integrator circuit, the output circuit of which supplies a milliammeter. If a greater precision is required, a chain 75 may be used, similar to the chain 73, or more simply constituted with a few accumulator stages with double diodes (preferably with cathode coupling in order to equalize the successive steps of potential) connected as semi-aperiodic frequency dividers. Furthermore, the stages of the divider of the chain 73 may also be connected in this manner, which enables their number to be reduced (since a single stage enables a ratio as low as 1/15 to be obtained without difficulty). The electronic switches will preferably be arranged in the form of mono-stable or bi-stable flip-flop devices.

Experience has shown that in practice it is sufficient to take $\alpha=4°$ (and, for reasons of simplicity, $\gamma=\alpha=4°$).

As already mentioned, the origin of the vertical angles measured can be transferred indifferently to the points $F_1$ or $F_2$. If for example this origin is at the point $F_1$, the zenithal distance has the value previously stated:

$$Za = 2\omega - \alpha + a_1$$

This change of origin may however be automatically compensated in a very simple manner, since it will only be necessary for example to displace by 2° the position of the total-reflection prism 1 (see FIGS. 1 and 2) in order to have a correct reading of the angular complement $a$ which must be added to the initial estimated value of $2a$.

It will of course be understood that modifications may be made to the forms of embodiment which have just been described, in particular by the substitution of equivalent technical means, without thereby departing from the spirit or the scope of the present invention.

In particular, changes may be made to the synoptic diagram of the electronic device which has been described, for example by replacing certain elements by other equivalent elements (for example electronic tubes by crystal diodes or transistrons, or alternatively the photo-electric cells by photo-transistrons); the order or the couplings of the various stages may also be modified or some of them may even be combined.

What I claim is:

1. In a pendular sextant type of astronomical navigation instrument mountable on a movable body for orientation in both vertical and horizontal planes and having reference means for forming a reference basis of the local vertical direction and having also an optical system having an optical axis directionally defined by two mirrors giving said axis the form of an inverse N, and forming a luminous point which is an optical image of an observed star on an image surface the limits of which are fixed in the focal plane of said optical system; the improvement comprising the combination of said means with scanning means for scanning said image surface in its entirety, at regular intervals, and for scanning said reference basis at regular intervals occurring in integer multiples of said first-mentioned intervals, means for generating a first group of electric pulses from said image surface scanning, means for generating a second group of electric pulses from said reference basis scanning, means for counting the pulses of the first group in each image surface scanning only during the time which elapses during the passing of said reference basis scanning means between said reference basis and said luminous point, and means for averaging the counting results for all the images scanned.

2. The combination according to claim 1, in which the scanning means comprises two main integral, coaxially rotatable components, the first of said components being a rotary drum provided for image scanning and the second of said components being a rotary disc provided for line scanning.

3. The combination according to claim 2, wherein said drum has an opaque cylindrical portion which is provided with a rectilinear slot parallel to the drum's axis and is located between the image surface of said optical system and a pulse generating means comprising a phototube.

4. The combination acording to claim 3, wherein said opaque cylindrical portion of the drum is provided with a plurality of said slots, and said disc is opaque and is provided with transparent radial divisions thereon uniformly distributed in the angle between consecutive slots of said drum, said disc being located between a light source and said phototube.

5. The combination according to claim 3, in which said phototube comprises a photomultiplier of electrons, positioned to receive a light beam passing through said slot when the latter passes in front of said luminous point on the image surface of said optical system.

6. The combination according to claim 4, in which said pulse generating means cooperative with the line scanning disc comprises an auxiliary source of light and a photo-electric cell positioned to receive the light beam passing through said transparent radial divisions when each division is passing in front of said source of light.

7. The combination according to claim 4, said rotary drum being provided with a plurality of such rectilinear slots, said transparent radial divisions being uniformly distributed on said disc in as many equal sectors as the number of rectilinear slots with which said drum is provided, said sectors being separated by opaque peripheral portions of equal width positioned to take account, on the one hand, of the edges of said image surface which is canned by the said slots and, on the other hand, of the displacement between said edges and said reference-basis image.

8. The combination according to claim 3, in which the angular width of the image surface scanned by said rectilinear slot of the drum is of the order of 4° on each side of the focus.

9. The combination according to claim 4, in which the angular distance between consecutive radial divisions of said disc corresponds to one minute of the angle to be measured.

10. The combination according to claim 4, in which the rotary drum and the disc are affixed to each other and are made of light metal, the radial divisions of the disc consisting of radial slots.

11. The combination according to claim 4, in which the said disc is of plastic material, its radial divisions consisting of transparent radial lines obtained by photographic means.

12. The combination according to claim 3, in which the rotary drum is provided with a helicoidal slot following said rectilinear slot and fixedly positioned with respect to the latter.

13. The combination according to claim 12, in which said helicoidal slot is inclined at 45° to the axis of the drum, and the length of the projection of light therethrough upon the circumference of the drum at a plane normal to the latter's axis of rotation is substantially equal to the total angular width of the image surface of said optical system.

References Cited in the file of this patent

UNITED STATES PATENTS

| | | |
|---|---|---|
| 2,140,579 | Gray | Dec. 20, 1938 |
| 2,145,347 | Everitt | Jan. 31, 1939 |
| 2,162,767 | Thurlow | June 20, 1939 |
| 2,578,307 | Hunt | Dec. 11, 1951 |
| 2,734,269 | Claret | Feb. 14, 1956 |
| 2,789,765 | Gillings | Apr. 23, 1957 |
| 2,791,377 | Dell et al. | May 7, 1957 |
| 2,791,695 | Bareford et al. | May 7, 1957 |
| 2,800,831 | Keiser et al. | July 30, 1957 |